April 21, 1970     P. F. DONLEY     3,507,504

SHAFT-SEALING SYSTEM

Filed March 8, 1967

INVENTOR.
PHILIP F. DONLEY
BY
ATTORNEYS.

United States Patent Office 3,507,504
Patented Apr. 21, 1970

3,507,504
SHAFT-SEALING SYSTEM
Philip F. Donley, Shaker Heights, Ohio, assignor, by mesne assignments, to Ernest F. Donley & Sons, Inc., Valley View, Ohio, a corporation of Ohio
Filed Mar. 8, 1967, Ser. No. 621,649
Int. Cl. F16j *15/34, 15/00*
U.S. Cl. 277—83                                      1 Claim

ABSTRACT OF THE DISCLOSURE

An improved shaft sealing system for a machine such as a pump of the impeller type in which (1) the shaft is encompassed at its opposite ends by stationary and rotatable end members; (2) in the space between such members the shaft is surrounded by a floating sealing unit; (3) that portion of the sealing unit which faces the stationary end member bears against a stationary seating element; and (4) such seating element is supported from the proximate end of an inwardly tapering spring metal carrier of annular shape which is held in place at its opposite end by the stationary end member.

BACKGROUND, RELATED APPLICATIONS, PATENTS, ETC.

The invention of this application is an improvement on that described in co-pending United States application Ser. No. 316,617, filed Oct. 16, 1963 for Shaft-Sealing System, now Patent No. 3,391,941. United States patents cited as references in such pending application, particularly Wishart Patent 1,759,029, Thompson Patent 1,820,-100, Heinrich Patent 3,028,163 and Thomas Patent 3,079,605, are representative of the prior art.

DRAWINGS

The invention is illustrated by way of example in the accompanying drawings, wherein.

PREFERRED EMBODIMENT

Figure 1:
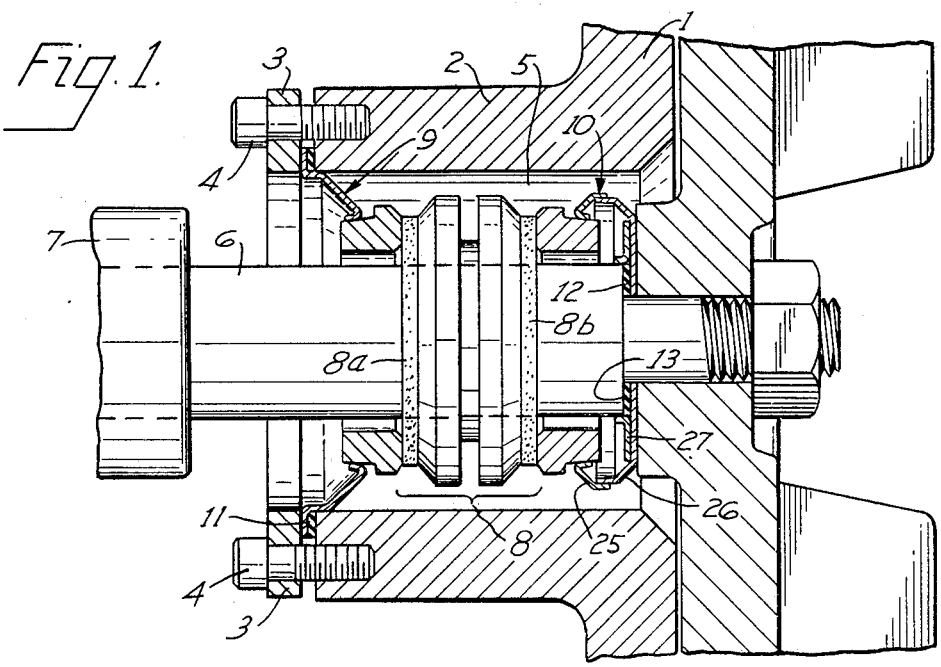
FIGURE 1 is a fragmentary section with parts in elevation through a pump of the impeller type in which the improved sealing system of the present invention is incorporated.

Although the principal objects of the invention are essentially the same as those set forth in prior application Ser. No. 316,617, the preferred embodiment of the invention differs from that of such prior application in the respects hereinafter indicated and emphasized. As before, pump housing 1, extension 2, stationary end member 3, bolts 4, chamber 5, shaft 6 and coupling 7 are conventional.

In chamber 5, between the opposed faces of the stationary end member and the impeller hub, is the sealing system of the instant invention. It incorporates as a part thereof a floating sealing unit 8 of the type disclosed in United States Patent 3,028,163 to Heinrich. Seen as in FIGURE 1, sealing unit 8 is flanked by two generally similar, but not identical, sub-assemblies 9 and 10, the former being stationary and bearing against sealing ring 8a and the latter being rotatable with shaft 6 and bearing against sealing ring 8b.

When sub-assembly 9 is readied for installation in the pump, it is first equipped with a snugly fitting gasket 11 that is designed to engage a portion of sub-assembly 9 that is intended to be clamped in position by stationary end member 3. On the opposite side of the sealing system, where rotatable sub-assembly 10 intervenes between sealing unit 8 and the impeller hub, a generally similar gasket 12 is interposed between shoulder 13 on shaft 6 and the portions of the sub-assembly remote from sealing unit 8. Both gaskets are resilient and to that end may be of leather, rubber, a suitable synthetic resin or the like.

A stepped and tapered annular carrier 15, the outer end of which is clamped between housing 2 and stationary end member 3, constitutes the outermost component of stationary sub-assembly 9. Preferably formed from a moderately heavy sheet of stainless steel that combines sturdiness, stiffness and a limited amount of flexibility, carrier 15 is nearly rigid. Best seen in FIGURE 3, it is characterized by the flat washer-like portion 16, by a short cylindrical portion 17 which forms a shoulder of a size such as to accommodate gasket 11, by a frusto-conical portion 18 that extends inwardly at an angle of about 45 degrees, and by a reversely inclined lip 19. It is of one-piece construction, being formed and shaped from flat stock.

Figures 2, 3:
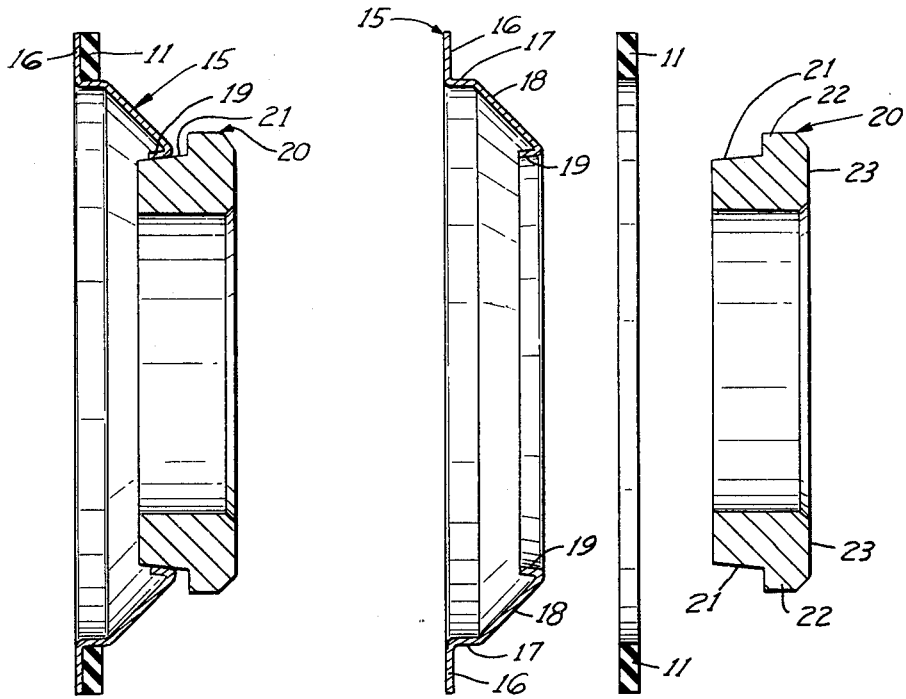
FIGURE 2 is an enlarged central section through the sub-assembly appearing in FIGURE 1 immediately to the left of the sealing unit.
FIGURE 3 is an exploded view of the components making up the sub-assembly of FIGURE 2.

Seen in cross-section, as in FIGURE 3, lip 19 and frusto-conical portion 18 define an angle slightly in excess of 45 degrees. Lip 19 departs from parallelism with the longitudinal axis of the sealing system by an angle which, for the sake of clarity, is shown in exaggerated fashion but which in practice is very small, normally about 3 degrees and less in any event than about 7½ degrees. Holding face 21 of seating element 20 likewise departs from parallelism with the longitudinal axis of the sealing system by a small angle of only a few degrees, usually about 3 degrees.

By forming lip 19 and holding face 21 in this way it becomes possible to attach carrier 15 to seating element 20 in very tenacious fashion. If, for example, the contacting surfaces are exact complements of each other, carrier 15 and seating element 20 will adhere so tenaciously as to require the use of a tool to separate them. Some other method of attaching carrier 15 to seating element 20 may be used if desired, but the method illustrated in FIGURES 1 to 3 is a particularly satisfactory one for the reason that, when necessary, it allows limited relative movement between carrier 15 and seating element 20.

As appears from FIGURES 2 and 3, seating element 20 is provided with a circumferential flange 22 extending outwardly beyond holding face 21. On the end remote from carrier 15, seating element 20 has a highly finished sealing face 23, preferably one that has been machined and lapped with a degree of accuracy within a few light bands. As a result of the presence of flange 22, sealing face 23 is relatively broad, permitting transverse movement between seating element 20 and the adjacent sealing ring 8a of sealing unit 8, see FIGURE 1.

In the drawings, seating element 20 is cross hatched to indicate that it is of metal; e.g., stainless steel. However, it may be of any other suitable material, including ceramic materials, comminuted compressed carbon, hard rubber, nylon, polytetrafluoroethylene ("Teflon") and the like. Although sealing ring 8a is stippled to indicate that it is of carbon, it may be of ceramic material, hard rubber, nylon, "Teflon" or any other suitable substance. Normally, sealing ring 8a and seating element 20 should not be of the same material.

Rotatable sub-assembly 10, seen in FIGURE 1, is comprised, apart from gasket 12, of a seating element similar to seating element 20, a carrier 25 formed after the fashion of a circular channel with an inclined bottom wall, a spacer 26 of annular shape, and an annular retainer 27. Spacer 26 and retainer 27 may appear from FIGURE 1 to be separable elements but they form a unitary structure, being welded together in the relationship there shown. Retainer 27 serves several purposes in the resulting structure; viz., (a) it stiffens spacer 26, (b) it locates it in the desired position, and (c) it helps retain gasket 12 in position.

Sub-assemblies 9 and 10, if constructed in the manner described, will be found to be characterized by a high degree of firmness but by adequate flexibility, both lengthwise and transversely. In consequence thereof, endwise movement of the shaft and even lateral movement in a direction transverse to the shaft axis can be tolerated within reasonable limits. Where there is such movement, sealing unit 8 tends to center itself in relation to the shaft.

It is difficult and in fact virtually impossible for the installer to distort the seating elements when installing sub-assemblies 9 and 10. Ordinarily distortion can come about when seating elements of the kinds commonly used in conventional sealing systems are drawn up too tightly by the mechanic by whom the installation is being made. Distortion of the seating element, if it occurs, tends to keep the sealing unit from operating at maximum efficiency. In sealing systems incorporating the present invention, this is not a problem.

It is intended that the patent shall cover, by summarization in the following claim, all features of patentable novelty residing in the invention.

I claim:
1. A machine comprising a housing; a rotatable shaft projecting from the housing; stationary and rotatable end members respectievly encompassing the outer and inner ends of the shaft; a floating sealing unit rotatably encompassing the shaft between the end members; a stationary seating element carried in spaced relation to the shaft between the sealing unit and the stationary end member with one of its end faces bearing against an adjacent end face of the sealing unit; a one-piece spring metal carrier of generally frustoconical shape (a) supported at its outer end by, (b) projecting inwardly from, and (c) tapering progressively in relation to said stationary end member; an integrally formed washer-like portion at the supoprted outer end of said carrier, such washer-like portion being clamped between the housing and the stationary end member; and, at the unsupported inner end of said carrier, an integrally-formed, reversely-tapered, outwardly-directed lip tenaciously engaging a correspondingly tapered holding face on the periphery of said stationary seating element.

References Cited
UNITED STATES PATENTS

| | | | |
|---|---|---|---|
| 1,759,029 | 5/1930 | Wishart | 277—83 X |
| 2,743,121 | 4/1956 | Stevens | 277—90 X |
| 3,028,163 | 4/1962 | Heinrich | 277—63 |
| 3,074,728 | 1/1963 | Freed | 277—90 X |
| 3,203,704 | 8/1965 | Mueller | 277—90 X |
| 3,391,941 | 7/1968 | Donley | 277—83 X |

LAVERNE D. GEIGER, Primary Examiner

J. S. MEDNICK, Assistant Examiner

U.S. Cl. X.R.

277—63, 90